(12) United States Patent
Bodziony et al.

(10) Patent No.: US 11,093,642 B2
(45) Date of Patent: Aug. 17, 2021

(54) PUSH DOWN POLICY ENFORCEMENT

(71) Applicant: International Business Machines Corporation, Armonk, NY (US)

(72) Inventors: Michal Bodziony, Tegoborze (PL); Lukasz S. Studzienny, Cracow (PL); Monika Piatek, Cracow (PL); Marcin Filip, Cracow (PL); Andrzej Laskawiec, Cracow (PL); Marcin Luczynski, Cracow (PL); Tomasz Zatorski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 16/238,913

(22) Filed: Jan. 3, 2019

(65) Prior Publication Data

US 2020/0218829 A1 Jul. 9, 2020

(51) Int. Cl.
*H04L 29/06* (2006.01)
*G06F 21/62* (2013.01)
(Continued)

(52) U.S. Cl.
CPC .......... *G06F 21/6254* (2013.01); *G06F 16/27* (2019.01); *G06F 16/9535* (2019.01)

(58) Field of Classification Search
CPC ...... G06F 21/10; G06F 21/6254; G06F 16/27; G06F 16/9535; H04L 63/20; H04L 63/30; H04L 63/205; H04L 63/302
See application file for complete search history.

(56) References Cited

U.S. PATENT DOCUMENTS 7,313,815 B2 * 12/2007 Pazi ................. H04L 29/12066
  709/229
7,809,685 B2 * 10/2010 Wolff ..................... G06F 21/64
  707/648
(Continued)

FOREIGN PATENT DOCUMENTS

WO   WO2016074094   5/2016

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
(Continued)

*Primary Examiner* — Hosuk Song
(74) *Attorney, Agent, or Firm* — Heslin Rothenberg Farley & Mesiti P.C.; Scott Dobson, Esq.

(57) ABSTRACT

A method, computer program product, and a system where a processor(s) intercepts a query from a client targeting a database. The processor(s) analyzes the query to determine contextual data relevant to the query and determines, based on a data masking policy, if a portion of results responsive to the intercepted query should be provided to the client as masked data. When the processor(s) determines that the portion of the results should be provided to the client as masked data, the processor(s) determines computing resources managing data comprising the results responsive to the intercepted query. The processor(s) executes the query on the computing resources by obtaining the masked data via coprocessors deployed on the computing resources, where the coprocessors mask the portion of the results. The processor(s) returns query results comprising the portion of the results masked by the coprocessors, to the client.

20 Claims, 7 Drawing Sheets

(51) Int. Cl.
  *G06F 16/27* (2019.01)
  *G06F 16/9535* (2019.01)

(56) References Cited

U.S. PATENT DOCUMENTS

| | | | | |
|---|---|---|---|---|
| 8,185,548 | B2* | 5/2012 | Lim | H04L 63/20 |
| | | | | 707/781 |
| 8,806,607 | B2* | 8/2014 | Archer | H04L 67/025 |
| | | | | 726/13 |
| 8,875,218 | B2* | 10/2014 | Lim | H04L 63/104 |
| | | | | 726/1 |
| 8,930,381 | B2 | 1/2015 | Raghunathan et al. | |
| 8,990,901 | B2* | 3/2015 | Aravindakshan | H04L 69/164 |
| | | | | 726/4 |
| 9,135,315 | B2* | 9/2015 | Barbas | G06F 16/248 |
| 2014/0164405 | A1 | 6/2014 | Tsai et al. | |
| 2017/0344495 | A1 | 11/2017 | Antonatos et al. | |
| 2018/0131726 | A1 | 5/2018 | Arumugam et al. | |
| 2018/0131727 | A1 | 5/2018 | Arumugam et al. | |

OTHER PUBLICATIONS

Sharma et al., "Securing Big Data Hadoop: A Review of Security Issues, Threats and Solution", International journal of Science and Information Technologies, vol. 5 (2), 2014, 2126-2131.

\* cited by examiner

PUSH DOWN POLICY ENFORCEMENT

BACKGROUND

Data privacy and security in enterprise systems can be maintained utilizing global policies. These global policies that guard this privacy and security can include, but are not limited to, data access and data anonymization policies. Data anonymization is a type of information sanitization whose intent is privacy protection and can include either encrypting or removing personally identifiable information from data sets, so that the people or entities whom the data describe remain anonymous.

Enforcement of these global policies, referred to as data masking or data obfuscation, can be implemented inside a component, a proxy, which is put in-between an application and a database. Data masking or obfuscation is the process of hiding original data using various techniques, including but not limited to, utilizing random characters or data or generating a hash of the original data. Data masking is relevant to data privacy and security policy enforcement because it applies masking to one or more data fields in order to protect data that is classified as personal identifiable data, personal sensitive data, and/or commercially sensitive data. Masking obfuscates the data in a manner that renders it usable for the purposes of undertaking valid test cycles, so it still appears real and consistent. For example, where data is needed for the purpose of application development, building program extensions and conducting various test cycles, it is common practice in enterprise computing to take data from the production systems to fill the data component required for these non-production environments and to mask this data, to protect privacy and security of the data.

Implementing data masking utilizing a proxy can adversely affect the performance of a system, especially in non-relational databases, where a proxy can become a processing bottleneck. One such non-relational database, which is built on a file system referred to as Hadoop Distributed File System (HDFS), is HBase. HBase is a column oriented non-relational big data database and provides a distributed, scalable, reliable, and versioned storage system capable of providing random read/write access in real-time. Because HBase can be spread across multiple (e.g., hundreds) of nodes, the architecture rendering data masking with a single proxy, is impractical. Attempts to extend the proxy to clustered components introduce complexities that can negatively impact security and processing performance because of the added complexity.

SUMMARY

Shortcomings of the prior art are overcome and additional advantages are provided through the provision of a method for masking query results. The method includes, for instance: intercepting, by one or more processors, a query from a client targeting a database; analyzing, by the one or more processors, the intercepted query to determine contextual data relevant to the intercepted query; based on the contextual data, determining, by the one or more processors, based on a data masking policy, if a portion of results responsive to the intercepted query should be provided to the client as masked data; based on determining that the portion of the results should be provided to the client as masked data, determining, by the one or more processors, one or more computing resources managing data comprising the results responsive to the intercepted query; executing, by the one or more processors, the intercepted query on the one or more computing resources, wherein the executing comprises obtaining the masked data via one or more coprocessors deployed on the one or more computing resources, wherein the one or more coprocessors mask the portion of the results; and returning, by the one or more processors, query results comprising the portion of the results masked by the one or more coprocessors, to the client.

Shortcomings of the prior art are overcome and additional advantages are provided through the provision of a computer program product for masking query results. The computer program product comprises a storage medium readable by a processing circuit and storing instructions for execution by the processing circuit for performing a method. The method includes, for instance: intercepting, by the one or more processors, a query from a client targeting a database; analyzing, by the one or more processors, the intercepted query to determine contextual data relevant to the intercepted query; based on the contextual data, determining, by the one or more processors, based on a data masking policy, if a portion of results responsive to the intercepted query should be provided to the client as masked data; based on determining that the portion of the results should be provided to the client as masked data, determining, by the one or more processors, one or more computing resources managing data comprising the results responsive to the intercepted query; executing, by the one or more processors, the intercepted query on the one or more computing resources, wherein the executing comprises obtaining the masked data via one or more coprocessors deployed on the one or more computing resources, wherein the one or more coprocessors mask the portion of the results; and returning, by the one or more processors, query results comprising the portion of the results masked by the one or more coprocessors, to the client.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
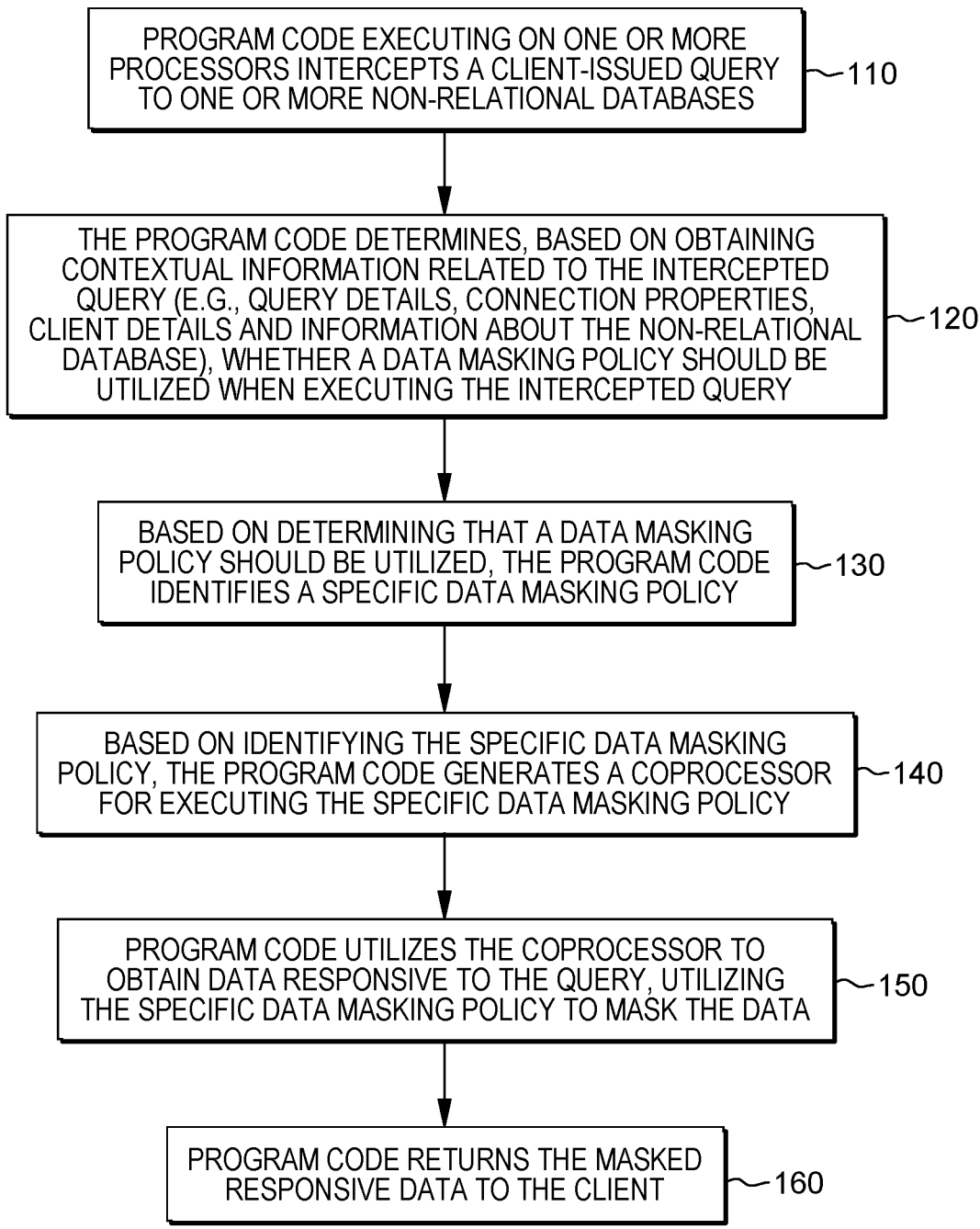
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
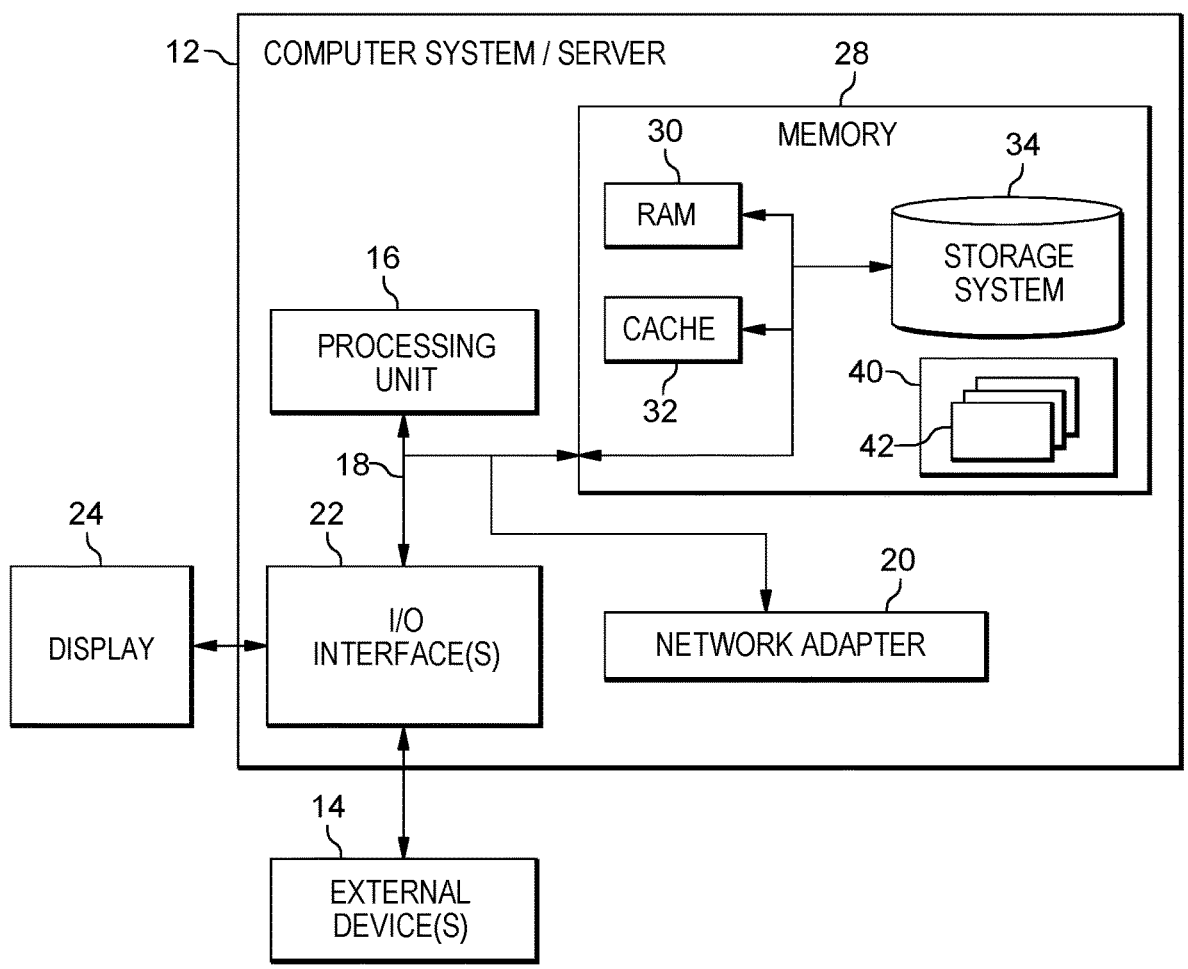
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Embodiments of the present invention include a computer-implemented method, a computer program product, and a computing system where program code executing on one or more processors provides data masking in processing a query to a non-relational distributed database by generating and utilizing one or more co-processors. In some embodiments of the present invention, the database is an HBase database. As discussed above. HBase is an example of a non-relational database, also referred to as a key/value NoSQL database.

A coprocessor is a framework that enables a client to run custom code on a selected server, such that data processing and distribution are handled within a distributed system at a common resource, or at one or more resources within a proximity to each other, among the resources in the distributed computing environment comprising resources utilized by the non-relational database, which can be spread over a large geographical area. For example, in HBase, a region is a unit of horizontal scalability and comprises a subset of a table's data that is contiguous (i.e., a contiguous, sorted, range of rows stored together). As tables grow, based on expanding data, a main HBase server will split the table into regions and various regions can fall under the control of slave servers, called region servers. Each region can only be served by a single region server. Thus, in embodiments of the present invention, program code can deploy a coprocessor for data masking to a region server and thus, create a situation where the resources of a region server are responsible both for the data and the masking of the data In general, coprocessors supplement the functionality of a processor and some operations performed by coprocessors include, but are not limited to, performing floating point arithmetic, generating graphics, performing signal processing, performing string processing, performing cryptography, and/or input/output interfacing with peripheral devices. Returning to the HBase example, as discussed above, a coprocessor provides an easy way to run custom code on a region server. In embodiments of the present invention, by deploying coprocessors to servers that manage portions of a database, program code executed on or more processing resource ensures that the computation (in this case, data masking) is as close to the data as possible, which improves performance.

Embodiments of the present invention are inextricably tied to computing and provide significantly more than existing technological approaches to data masking in query execution in (e.g., non-relational) databases. First, aspects of various embodiments of the present invention are inextricably tied to computing at least because these aspects provide an approach for utilizing a coprocessor framework for providing query results with data masking in a (e.g., non-relational) distributed database environment. Providing data masking in a distributed environment is a technological challenge that is unique to computing and generating a coprocessor to handle data masking, in order to maintain processing performance as well as data integrity, is an approach to this computing-centric challenge that is inextricably tied to computing. Second, as discussed above, some existing approaches utilize proxies to mask data responsive to database queries, but unlike aspects of embodiments of the present invention, these approaches either creates a bottleneck or introduce complexities that adversely affect processing and security. Embodiments of the present invention handle data masking on a coprocessor deployed proximate to responsive data, thus, providing a significant advantage over the existing approach, as experienced, for example, through the performance of the system.

FIG. 1 is a workflow 100 that provides an overview of certain aspects of some embodiments of the preset invention. Specifically, FIG. 1 illustrates various aspects of executing a query on a non-relational, distributed, database, in accordance with some embodiments of the present invention, utilizing a coprocessor for data masking.

Referring to FIG. 1, in some embodiments of the present invention, program code executing on one or more processors intercepts a client-issued query to one or more non-relational databases (110). The intercepting program code can comprise a proxy. The program code determines, based on obtaining contextual information related to the intercepted query (e.g., query details, connection properties, client details and information about the non-relational database), whether a data masking policy should be utilized when executing the intercepted query (120). Based on determining that a data masking policy should be utilized, the program code identifies a specific data masking policy (130). Data masking algorithms may include, but are not limited to, skipping columns of rows, masking with constant values, hashing, encoding with (a)symmetric key, tokenization, and/or chameleon pseudonymization. Based on identifying the specific data masking policy, the program code generates a coprocessor for executing the specific data masking policy (140). The program code generates the coprocessor by compiling the data masking code in a coprocessor and deploying the coprocessor on one or more servers managing data that is a target of the query. In the case of the non-relational database being HBase, the program code deploys the coprocessor to the one or more region servers which control database regions targeted by the intercepted query. The program code utilizes the coprocessor to obtain data responsive to the query, utilizing the specific data masking policy to mask the data (150). The program code returns the masked responsive data to the client (160). In some embodiments of the present invention, the program code that returns the responsive data to the client is the same proxy that initially intercepted the query.

Figure 2:
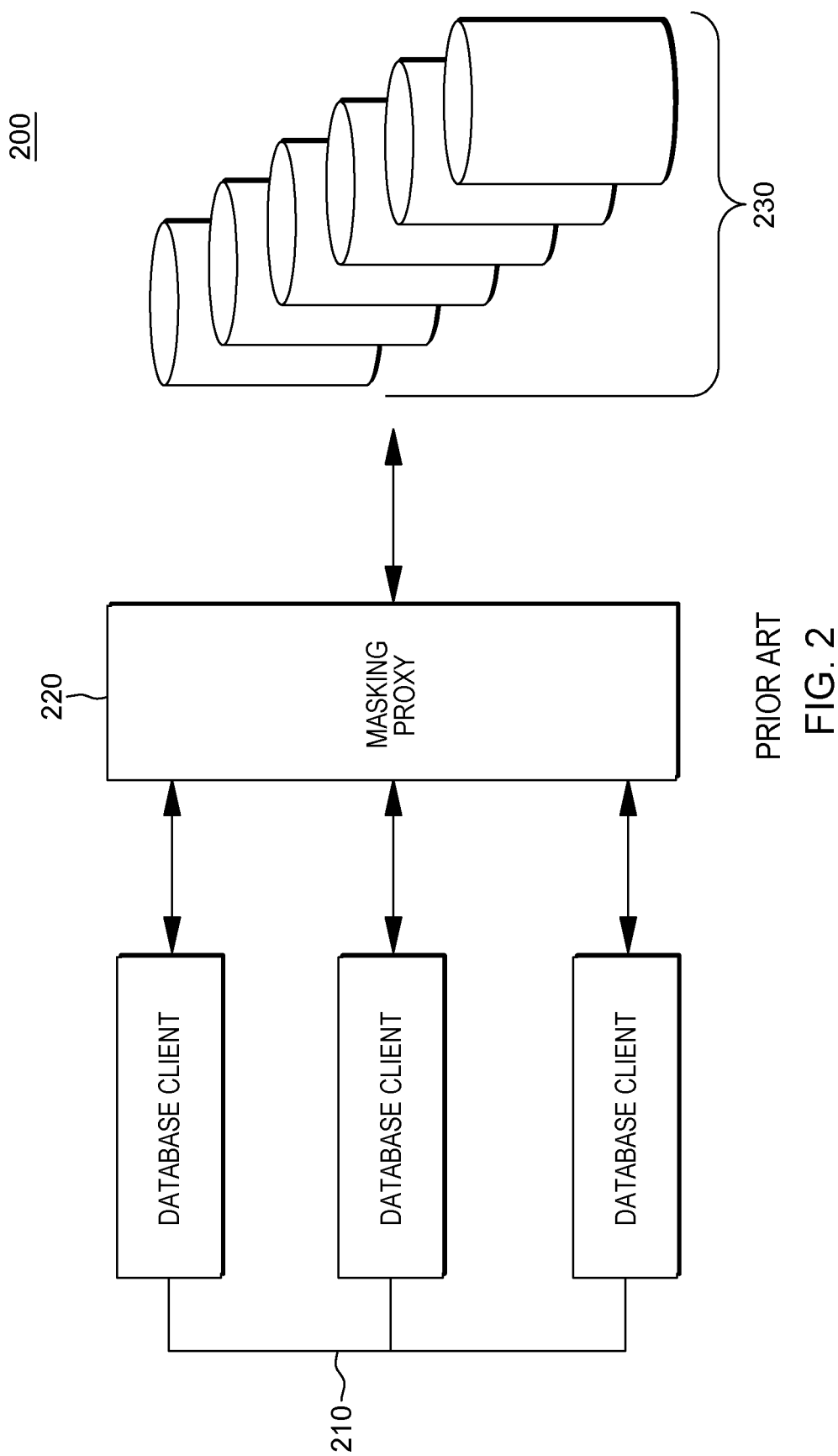
FIG. 2 is an illustration of an existing approach to data masking utilizing a proxy to mask the data responsive to a query

To contrast with aspects of embodiments of the present invention, FIG. 2 illustrates an existing approach to data masking utilizing a proxy to mask the data responsive to a query. In FIG. 2, a masking proxy 220 performs data masking when returning query results from one or more databases 230 to one or more database clients 210, which originated the queries. As illustrated in FIG. 2, the masking proxy 220 is a processing bottleneck, as each database client 210 executes its queries to the databases 230 through the masking proxy 220 and receives query results through the masking proxy 220. In cases where data accessed by the masking proxy 220 is spread over a variety of resources in a distributed environment, the negative impacts of the bottleneck may be realized more intensely.

Figure 3:
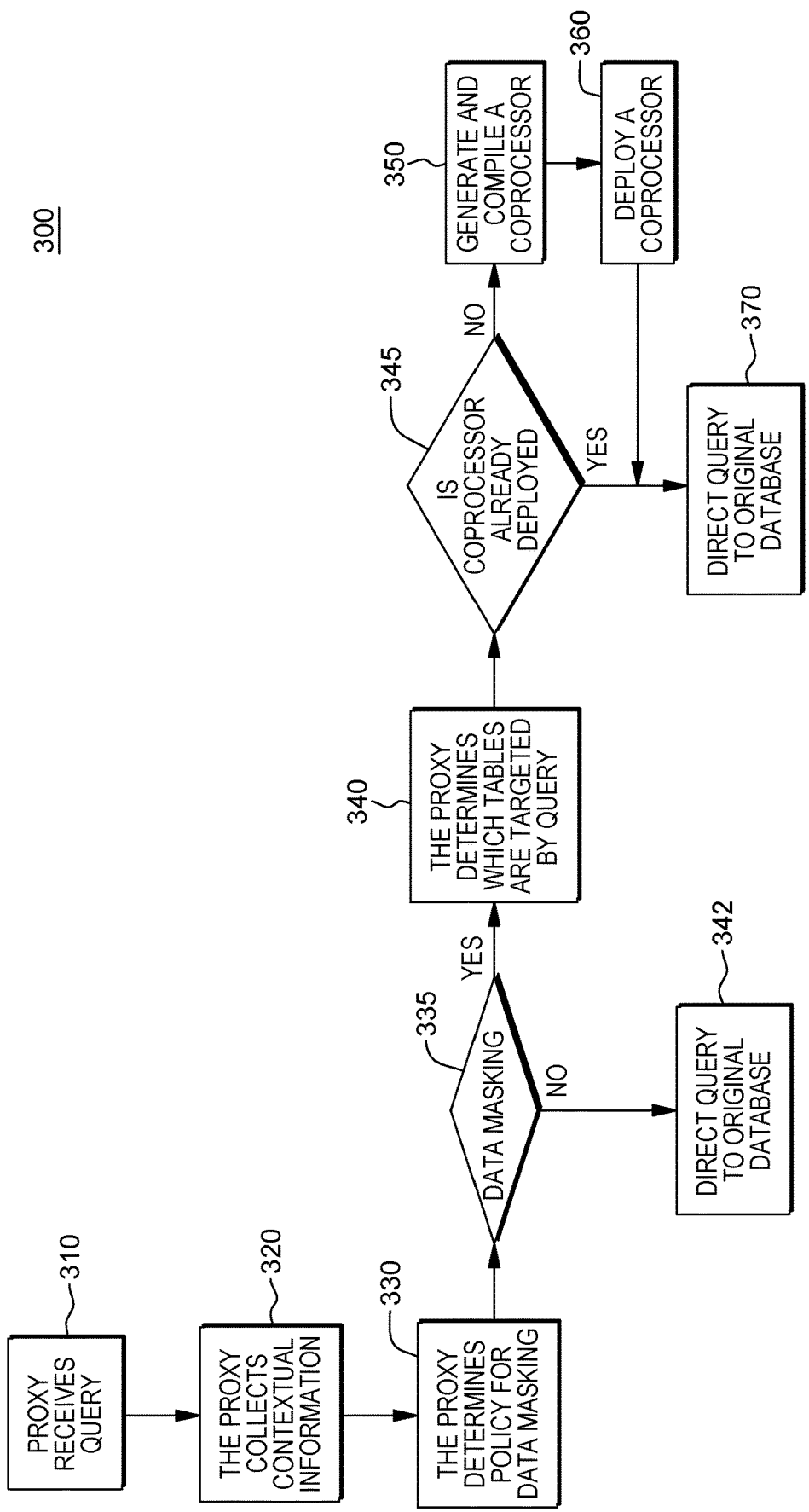
FIG. 3 is a workflow illustrating certain aspects of an embodiment of the present invention.

FIG. 3 is a workflow 300 that illustrates certain aspects of some embodiments of the present invention and depicts how rather than utilize a proxy for data masking (e.g., FIG. 2, 220) program code in embodiments of the present invention pushes data masking to the database itself, by generating and deploying coprocessors. In embodiments of the present invention where the database is an HBase, the program code pushes data masking to the HBase by creating dedicated HBase coprocessors and deploying the coprocessors to region servers. In some embodiments of the present invention, a data masking proxy receives a query from a client (310). The proxy comprised program code executing on one or more processing resources. In contrast to FIG. 2, instead of executing the query and performing the data masking, as illustrated in FIG. 2, is the illustrated embodiment of the present invention, the proxy collects contextual information about the query (320). The proxy determines if there is are one or more system policies for masking data returned as results of queries (330). The proxy determines if one or more data masking policies are applicable, based on the contextual data (335). Contextual data can include, but is not limited to, query details, connection properties, client details and information about the non-relational database. If the proxy determined that there is no policy to mask data, based on the contextual data, the proxy executes a direct query on the database (342) and returns unmasked query results to the client from which the query originated (not pictured). If the proxy determines that data masking should be applied to the query results, based on the query context, the proxy determines which tables of the database are targeted by the query and identifies the resources responsible for the tables (340). Determining which tables are targeted by a query enables the proxy to determine which servers in a distributed system manage and maintain data that the queries would access. For example, in embodiments of the present invention where the database in an HBase, different data regions are managed by different region servers. Thus, by determining what data will be accessed to respond to the query, the proxy determines which resources are responsible for that data.

Returning to FIG. 3, in some embodiments of the present invention, having identified the targeted tables (and the resources responsible for the tables in the database system), the program code determines if a coprocessor has already been deployed to the resources responsible for the targeted tables (345). Provided that a coprocessor, which handles the data masking, has already been deployed to the resources responsible for the targeted tables, the proxy directs the query to the database (370), via the coprocessor, such that the coprocessor performs the data masking and the proxy then returns the responsive data to the client (e.g., FIG. 1, 160). In some embodiments of the present invention, a proxy will destroy a deployed coprocessor after the coprocessor masks results from a given query. However, certain embodiments will leave coprocessors in place for use with future queries. Thus, in FIG. 3, the proxy checks for an existing coprocessor.

Returning to FIG. 3, if the proxy determines that a coprocessor (for performing data masking) has not been deployed to the resources responsible for the targeted tables, the proxy generates and compiles a coprocessor (350) and deploys the coprocessor to the resources responsible for the targeted tables (360). Once the coprocessor has been deployed, the proxy directs the query to the database (370), via the coprocessor, such that the coprocessor performs the data masking and the proxy then returns the responsive data to the client (e.g., FIG. 1, 160). In embodiments of the present invention where the database is an HBase, the proxy identifies the one or more regions of data accessed by the query and the one or more region servers responsible for these regions. The proxy then determines whether a coprocessor has been deployed to the identified region servers and if no proxy was already deployed, the proxy generates, compiles, and deploys a coprocessor for data masking, to the region servers.

Figure 4:
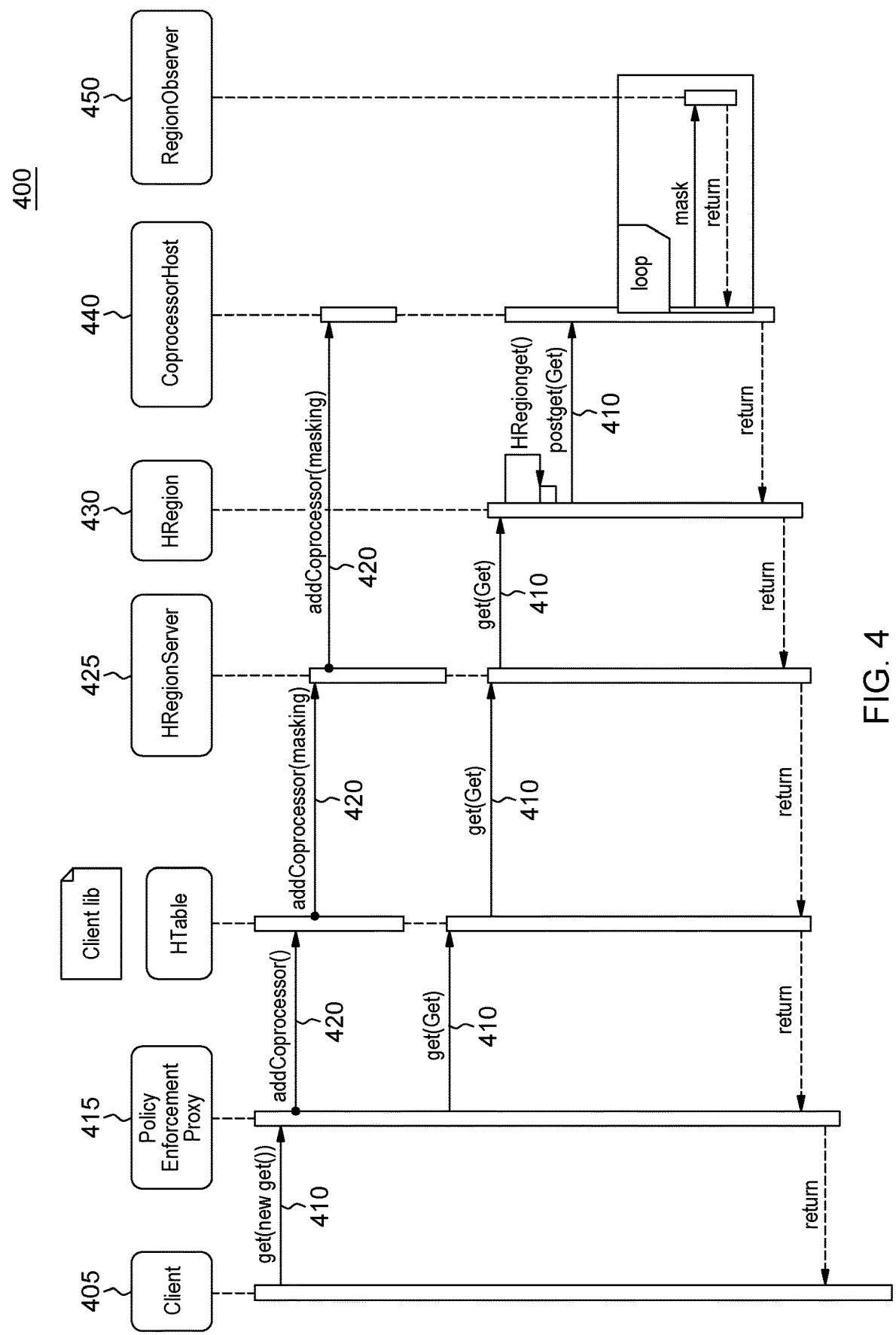
FIG. 4 is a sequence of actions that depicts various aspects of the present invention when utilized in an HBase database environment.

FIG. 4 is an illustrative sequence 400 of actions that depicts various aspects of some embodiments of the present invention when utilized in an HBase database environment. Although FIG. 4 employs the specific example of an HBase, as understood by one of skill in the art, aspects of various embodiments of the present invention are applicable for data masking query results across various distributed database systems. As illustrated in FIG. 4, a client 405 issues a query 410 to an HBase (database system). A proxy 415 (program code executing on one or more processors) intercepts the query and obtains contextual information (e.g., query details, connection properties, client details, and/or information about the target database) from the intercepted query, as inputs, to determine an appropriate data masking policy, including whether masking is needed, based on the contextual information and/or the applicable policy. Based on determining that masking is needed for the intercepted query, the proxy generates one or more coprocessors 420. The proxy compiles the coprocessor 420 and deploys the one or more coprocessor 420 on region servers 425. The coprocessor 420 deployed provides data masking. Thus, the proxy 415 compiles the coprocessor 420 and deploys the coprocessor 420 on relevant region servers 425 (region servers that manage/house the regions 430 that contain the data being requested responsive to the query). The proxy executes the query on the region and the coprocessor 420, having been deployed to a coprocessor host 440, retrieves and transforms the data. A region observer 450 (i.e., RegionObserver) provides a facility in the coprocessor to hook the data masking code when the query on the region is performed. Thus, the query execution by the proxy triggers the data masking by the region observer 450. The proxy 415 returns the masked data to the client 405. In some embodiments of the present invention, the proxy 415 removes or otherwise deactivates the coprocessor 420 deployed on the coprocessor host 440. In some embodiments of the present invention, the coprocessor 420 remains deployed on the host 440 and can be used in subsequent queries on the region 430.

Extract, Transform and Load (ETL) job developers (i.e., developers responsible for a process in data warehousing responsible for pulling data out of the source systems and placing it into a data warehouse) can utilize aspects of various embodiments of the present invention as a feature of ETL designing tools (e.g., IBM® InfoSphere™ DataStage® and/or Oracle Data Integration Studio). IBM® InfoSphere™ DataStage® is a product of International Business Machines Corporation. DataStage® is a registered trademark of International Business Machines Corporation, Armonk, N.Y., US. During a development process, policy enforcement can be accomplished through the use of a coprocessor and coprocessor code can be generated as a boilerplate data masking and this boilerplate can be modified/optimized by an ETL developer in a designer tool.

Embodiments of the present invention can also be utilized during runtime. Generating and deploying coprocessors for data masking during runtime, in accordance with aspects of some embodiments of the present invention, enables customers to avoid database (e.g., HBase) internal manipulations. The push-down masking on the fly, enables a user of client to receive results without interacting with the complexities of the database.

Embodiments of the present invention include a computer-implemented method, a computer program product, and a computer system, where program code executing on one or more processors intercept a query from a client targeting a database. The program code analyzes the intercepted query to determine contextual data relevant to the intercepted query. Based on the contextual data, the program code determines, based on a data masking policy, if a portion of results responsive to the intercepted query should be provided to the client as masked data. Based on determining that the portion of the results should be provided to the client as masked data, the program code determines one or more computing resources managing data comprising the results responsive to the intercepted query. The program code executes the intercepted query on the one or more computing resources, where the executing comprises obtaining the masked data via one or more coprocessors deployed on the one or more computing resources, where the one or more coprocessors mask the portion of the results. The program code returns query results comprising the portion of the results masked by the one or more coprocessors, to the client.

In some embodiments of the present invention, determining if the portion of results responsive to the intercepted query should be provided to the client as masked data further comprises: the program code determining how the portion of results responsive to the intercepted query should be provided to the client as masked data.

In some embodiments of the present invention, executing the intercepted query on the one or more computing resources comprises: the program code generating one or more coprocessors, compiling program code comprising the data masking policy into the one or more coprocessors, and deploying the one or more coprocessors to the one or more computing resources.

In some embodiments of the present invention, executing the intercepted query on the one or more computing resources comprises: the program code determining if the one or more coprocessors were deployed to the one or more computing resources, and based on determining that the one or more coprocessors were deployed to the one or more computing resources, the program code initiating the intercepted query.

In some embodiments of the present invention, executing the intercepted query on the one or more computing resources comprises: the program code determining if the one or more coprocessors were deployed to the one or more computing resources, based on the program code determining that the one or more coprocessors were not deployed to the one or more computing resources, the program code generating one or more coprocessors, the program code compiling, by the one or more processors, code comprising the data masking policy into the one or more coprocessors, the program code deploying the one or more coprocessors to the one or more computing resources, and the program code initiating the intercepted query.

In some embodiments of the present invention, the program code initiating the intercepted query triggers the one or more coprocessors to mask the portion of the results.

In some embodiments of the present invention, the one or more coprocessors are triggered by one or more region observer facilities in the one or more coprocessors.

In some embodiments of the present invention, the contextual data is selected from the group consisting of: query details, connection properties, client details, information about the database, geographic location, and timestamp of the intercepted query.

In some embodiments of the present invention, the database comprises a non-relational distributed database.

In some embodiments of the present invention, the database comprises a distributed database.

In some embodiments of the present invention, the database comprises an HBase, the data comprising the results responsive to the intercepted query comprise one or more regions, and the one or more computing resources comprise region servers for the one or more regions.

In some embodiments of the present invention, the program code intercepting the query from a client targeting a database, the program code analyzing the intercepted query, the program code determining if the portion of results responsive to the intercepted query should be provided to the client as masked data, and the program code executing the intercepted query, are accomplished by via a proxy.

In some embodiments of the present invention, the program code executing the intercepted query comprises: the program code generating, by the proxy, one or more coprocessors, the program code compiling, by the proxy, code comprising the data masking policy into the one or more coprocessors, and the program code deploying, by the proxy, the one or more coprocessors to the one or more computing resources.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention the client 405 (FIG. 4), computing resources executing the proxy 415 (FIG. 4), and the region server 430 (FIG. 4) can each be understood as a cloud computing node 10 (FIG. 5) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
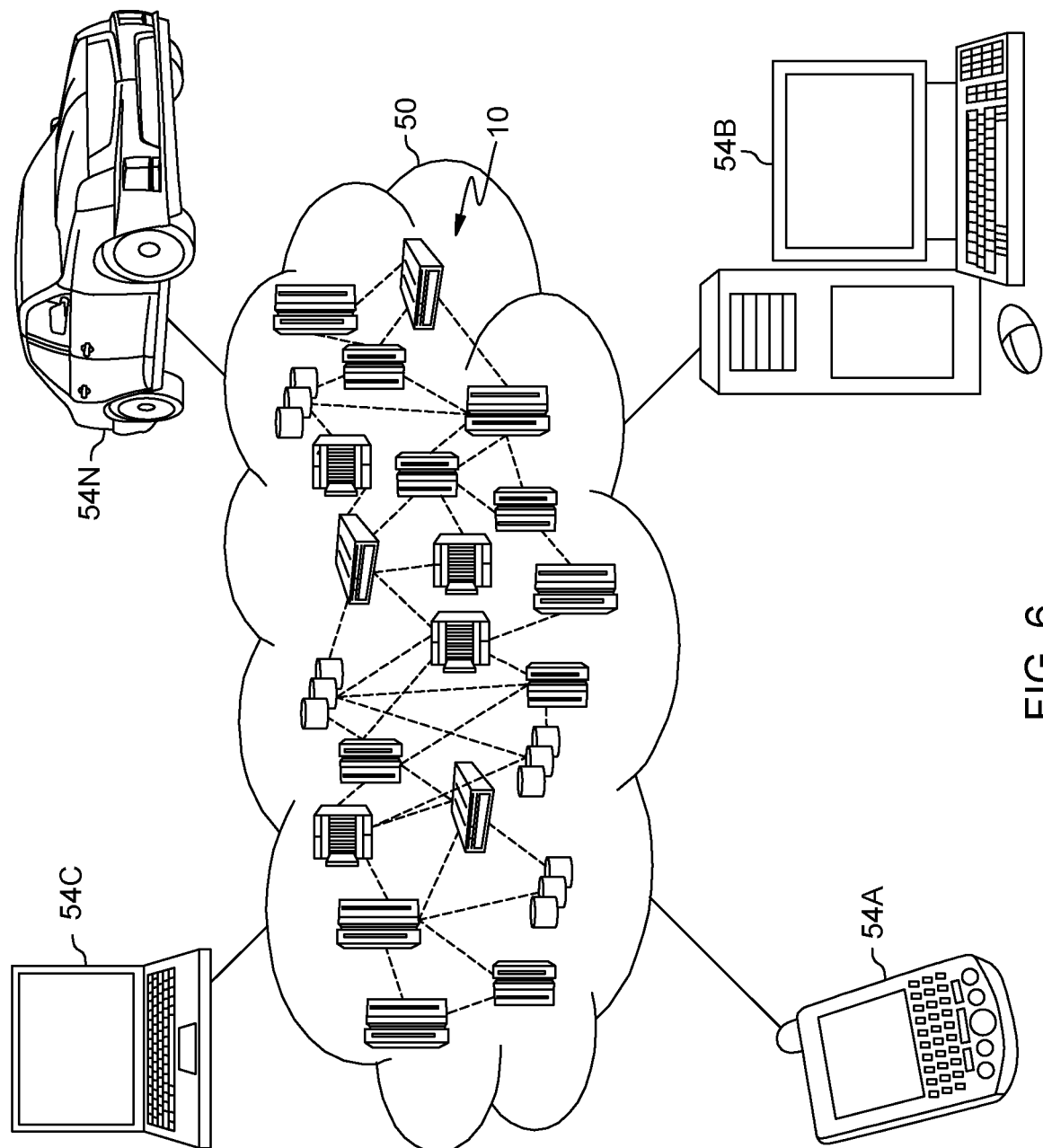
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
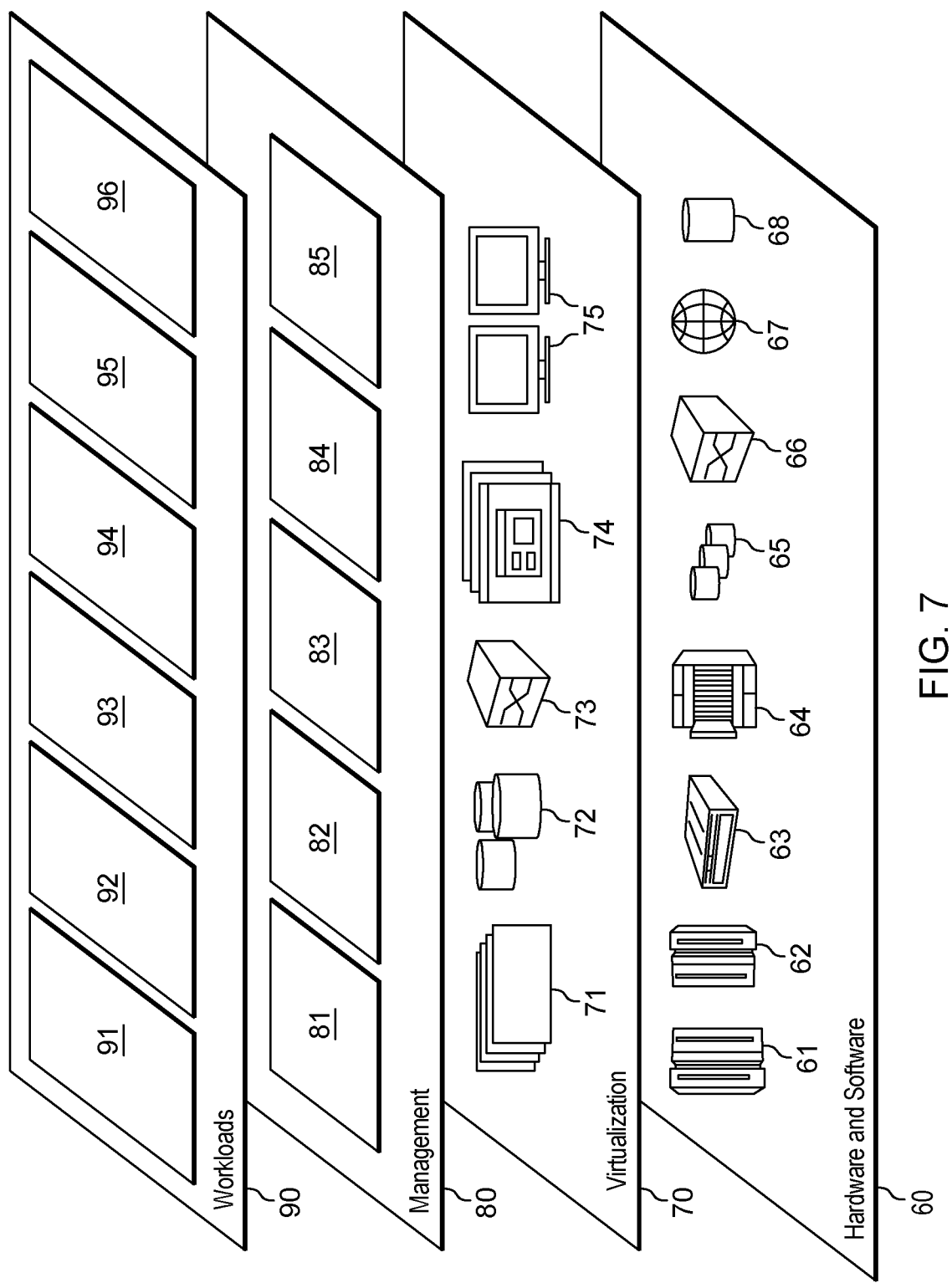
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a coprocessor for data masking 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
intercepting, by one or more processors, a query from a client targeting a database;
analyzing, by the one or more processors, the intercepted query to determine contextual data relevant to the intercepted query;
based on the contextual data, determining, by the one or more processors, based on a data masking policy, if a portion of results responsive to the intercepted query should be provided to the client as masked data;
based on determining that the portion of the results should be provided to the client as masked data, determining, by the one or more processors, one or more computing resources managing data comprising the results responsive to the intercepted query;
executing, by the one or more processors, the intercepted query on the one or more computing resources, wherein the executing comprises obtaining the masked data via one or more coprocessors deployed on the one or more computing resources, wherein the one or more coprocessors mask the portion of the results; and
returning, by the one or more processors, query results comprising the portion of the results masked by the one or more coprocessors, to the client.

2. The computer-implemented method of claim 1, wherein determining if the portion of results responsive to the intercepted query should be provided to the client as masked data further comprising:
determining, by the one or more processors, how the portion of results responsive to the intercepted query should be provided to the client as masked data.

3. The computer-implemented method of claim 1, wherein executing the intercepted query on the one or more computing resources comprises:
generating, by the one or more processors, one or more coprocessors;
compiling, by the one or more processors, code comprising the data masking policy into the one or more coprocessors; and
deploying, by the one or more processors, the one or more coprocessors to the one or more computing resources.

4. The computer-implemented method of claim 1, wherein executing the intercepted query on the one or more computing resources comprises:
determining, by the one or more processors, if the one or more coprocessors were deployed to the one or more computing resources; and
based on determining that the one or more coprocessors were deployed to the one or more computing resources, initiating the intercepted query.

5. The computer-implemented method of claim 1, wherein executing the intercepted query on the one or more computing resources comprises:
determining, by the one or more processors, if the one or more coprocessors were deployed to the one or more computing resources;
based on determining that the one or more coprocessors were not deployed to the one or more computing resources, generating, by the one or more processors, one or more coprocessors;
compiling, by the one or more processors, code comprising the data masking policy into the one or more coprocessors;
deploying, by the one or more processors, the one or more coprocessors to the one or more computing resources; and
initiating, by the one or more processors, the intercepted query.

6. The computer-implemented method of claim 5, wherein initiating the intercepted query triggers the one or more coprocessors to mask the portion of the results.

7. The computer-implemented method of claim 6, wherein the one or more coprocessors are triggered by one or more region observer facilities in the one or more coprocessors.

8. The computer-implemented method of claim 1, wherein the contextual data is selected from the group consisting of: query details, connection properties, client details, information about the database, geographic location, and timestamp of the intercepted query.

9. The computer-implemented method of claim 1, wherein the database comprises a non-relational database.

10. The computer-implemented method of claim 1, wherein the database comprises a distributed database.

11. The computer-implemented method of claim 1, wherein the database comprises an HBase, wherein the data comprising the results responsive to the intercepted query comprise one or more regions, and wherein the one or more computing resources comprise region servers for the one or more regions.

12. The computer-implemented method of claim 1, wherein intercepting the query from a client targeting a database, analyzing the intercepted query, determining if the portion of results responsive to the intercepted query should be provided to the client as masked data, and executing the intercepted query, are accomplished by via a proxy.

13. The computer-implemented method of claim 12, wherein executing the intercepted query comprises:
generating, by the proxy, one or more coprocessors;
compiling, by the proxy, code comprising the data masking policy into the one or more coprocessors; and
deploying, by the proxy, the one or more coprocessors to the one or more computing resources.

14. A computer program product comprising:
a non-transitory computer readable storage medium readable by one or more processors and storing instructions for execution by the one or more processors for performing a method comprising:
intercepting, by the one or more processors, a query from a client targeting a database;
analyzing, by the one or more processors, the intercepted query to determine contextual data relevant to the intercepted query;
based on the contextual data, determining, by the one or more processors, based on a data masking policy, if a portion of results responsive to the intercepted query should be provided to the client as masked data;
based on determining that the portion of the results should be provided to the client as masked data, determining, by the one or more processors, one or more computing resources managing data comprising the results responsive to the intercepted query;

executing, by the one or more processors, the intercepted query on the one or more computing resources, wherein the executing comprises obtaining the masked data via one or more coprocessors deployed on the one or more computing resources, wherein the one or more coprocessors mask the portion of the results; and returning, by the one or more processors, query results comprising the portion of the results masked by the one or more coprocessors, to the client.

15. The computer program product of claim 14, wherein executing the intercepted query on the one or more computing resources comprises:

generating, by the one or more processors, one or more coprocessors;

compiling, by the one or more processors, code comprising the data masking policy into the one or more coprocessors; and deploying, by the one or more processors, the one or more coprocessors to the one or more computing resources.

16. The computer program product of claim 14, wherein executing the intercepted query on the one or more computing resources comprises:

determining, by the one or more processors, if the one or more coprocessors were deployed to the one or more computing resources; and based on determining that the one or more coprocessors were deployed to the one or more computing resources, initiating the intercepted query.

17. The computer program product of claim 14, wherein executing the intercepted query on the one or more computing resources comprises:

determining, by the one or more processors, if the one or more coprocessors were deployed to the one or more computing resources;

based on determining that the one or more coprocessors were not deployed to the one or more computing resources, generating, by the one or more processors, one or more coprocessors;

compiling, by the one or more processors, code comprising the data masking policy into the one or more coprocessors;

deploying, by the one or more processors, the one or more coprocessors to the one or more computing resources; and initiating, by the one or more processors, the intercepted query.

18. The computer program product of claim 17, wherein initiating the intercepted query triggers the one or more coprocessors to mask the portion of the results.

19. The computer program product of claim 18, wherein the one or more coprocessors are triggered by one or more region observer facilities in the one or more coprocessors.

20. A system comprising:

a memory;

one or more processors in communication with the memory;

program instructions executable by the one or more processors via the memory to perform a method, the method comprising:

intercepting, by the one or more processors, a query from a client targeting a database;

analyzing, by the one or more processors, the intercepted query to determine contextual data relevant to the intercepted query;

based on the contextual data, determining, by the one or more processors, based on a data masking policy, if a portion of results responsive to the intercepted query should be provided to the client as masked data;

based on determining that the portion of the results should be provided to the client as masked data, determining, by the one or more processors, one or more computing resources managing data comprising the results responsive to the intercepted query;

executing, by the one or more processors, the intercepted query on the one or more computing resources, wherein the executing comprises obtaining the masked data via one or more coprocessors deployed on the one or more computing resources, wherein the one or more coprocessors mask the portion of the results; and returning, by the one or more processors, query results comprising the portion of the results masked by the one or more coprocessors, to the client.

\* \* \* \* \*